United States Patent Office 3,393,209
Patented July 16, 1968

3,393,209
FURFURYL AND TETRAHYDROFURFURYL PHENYL UREAS
Theodore E. Majewski, Midland, Mich., assignor to The Dow Chemical Company, Midland, Mich., a corporation of Delaware
No Drawing. Filed Oct. 4, 1965, Ser. No. 492,886
4 Claims. (Cl. 260—347.3)

The present invention is directed to the new urea compounds comprising 1-furfuryl-3-phenyl urea, 1-furfuryl-1-methyl-3-phenyl urea and 1-methyl-3-phenyl-1-(tetrahydrofurfuryl)urea. These compound correspond to the following formulae

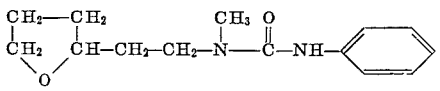

and

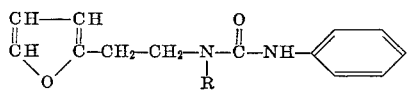

In this and succeeding formula, R represents hydrogen or methyl. The compounds are either liquids or solids which are of very low solubility in water and many organic solvents. The compounds have been found to be useful as herbicides for the killing and the control of the growth of many species of plants such as Japanese millet, pigweeds, crabgrass, cucumber, sudan grass, radish and corn.

The new urea compounds are prepared by reacting phenyl isocyanate with furfurylamine, N-methyl furfurylamine or 2-tetrahydro furfurylamine. The reaction is conveniently carried out in an inert organic liquid as reaction medium. Representative media include benzene, chlorobenzene, dioxane and perchloroethylene. The proportions of the reactants to be employed are not critical, some of the desired product being formed when contacting the reactants in any proportions. However, the reaction consumes the reactants in equimolar proportions and the use of such proportions is preferred. The reaction is slightly exothermic and takes place readily at temperatures between 0° C. and 100° C. and preferably at temperatures of from 50° C. to 100° C. Following the reaction, the desired product is separated by conventional procedures.

In carrying out the production of the desired products, the reactants are contacted in any order or fashion and preferably in the presence of an inert organic liquid as reaction medium. Following the contacting of the reactants, the reaction mixture is maintained at the reaction temperature for a period of time to insure completion of the reaction. In most cases the solid 1-furfuryl-1-methyl-3-phenyl urea and the solid 1-furfuryl-3-phenyl urea products will precipitate in the reaction medium during the heating period. In such cases, the temperature of the reaction mixture is maintained in the reaction temperature range until there is a substantial cessation in the precipitation of the desired product. When these products do not so precipitate in the reaction medium during the reaction period they can be caused to precipitate by such conventional procedures as cooling the reaction mixture or concentrating the reaction mixture by removing the low boiling constituents. Thereafter the solid products can be separated from the reaction mixture by such conventional procedures as filtration or decantation. The 1-methyl-3-phenyl-1-(tetrahydrofurfuryl)urea product is a liquid and can be separated from the reaction mixture by such conventional procedures as fractional distillation or evaporation of the low boiling constituents of the reaction mixture to obtain the product as a liquid residue. Once the products are isolated they can be employed in pesticidal applications or further purified by such procedures as recrystallization or washing before being so employed.

The following examples are merely illustrative and are not intended to be limiting.

Example 1.—1-furfuryl-1-methyl-3-phenyl urea

N-methylfurfurylamine (25.6 grams; 0.23 mole) dispersed in 50 milliliters of benzene was mixed with stirring at room temperature with phenyl isocyanate (27.4 grams; 0.23 mole) dispersed in 50 milliliters of benzene. Immediately upon contacting the reactants, the 1-furfuryl-1-methyl-3-phenyl urea compound began to precipitate in the reaction mixture. The reaction mixture was allowed to stand overnight at room temperature and then filtered to obtain the solid product. The solid 1-furfuryl-1-methyl-3-phenyl urea compound was washed with benzene, air dried and found to melt at 105.5°–106° C.

Example 2

A dispersion of furfurylamine (22.2 grams; 0.23 mole) in 100 milliliters of dry benzene was added with stirring to a dispersion of phenyl isocyanate (27.4 grams; 0.23 mole) in 75 milliliters of dry benzene. During the contacting of the reactants the temperature of the reaction mixture was not allowed to exceed 60° C. The solid 1-furfuryl-3-phenyl urea product precipitated in the reaction mixture while the reactants were being contacted. Following the contacting of the reactants the stirring was stopped and the reaction mixture allowed to stand overnight. Thereafter the 1-furfuryl-3-phenyl urea product was collected by filtration, washed several times with benzene and dried at 80° C. The dried product was found to melt at 12.5°–130° C. and have a nitrogen content of 12.89 percent as compared to the theoretical content of 12.90 percent.

Example 3.—1-methyl-3-phenyl-1-(tetrahydrofurfuryl) urea

N-methyl tetrahydrofurfurylamine (26.4 grams; 0.23 mole) dispersed in 50 milliliters of benzene was contacted with stirring and at room temperature with phenyl isocyanate (27.4 grams; 0.23 mole) dispersed in 50 milliliters of benzene. Heat was liberated by the reaction during the contacting of the reactants. Following the contacting of the reactants, the reaction mixture was cooled to room temperature and allowed to stand at room temperature for 3 days. Thereafter the benzene was allowed to evaporate leaving an oily residue. This oily residue was distilled under vacuum to obtain the 1-methyl-3-phenyl-1-(tetrahydrofurfuryl) urea product which had a freezing point of 38.4° C. and a nitrogen content of 12.17 percent as compared to the theoretical content of 11.96 percent.

The compounds of the present invention can be employed as pesticides. For instance, these new compounds can be employed to kill or control the growth of many species of plants. In such uses any one or a combination of the urea compounds can conveniently be employed in liquid or dust compositions. In such usage, the compounds are modified with one or more of a plurality of adjuvants or helps including water, organic solvents, petroleum oils, petroleum distillates, naphthas or other liquid carriers, surface active dispersing agents and finely divided solids such as chalk, talc or bentonite. The preferred petroleum distillates are those boiling almost entirely under 400° F. at atmospheric pressure and having a flash point about 80° F. The substituted phenyl urea compounds can be dispersed on an inert finely divided solid and the resulting preparation employed as a dust. Also, such preparations can be dispersed in water with or without the aid of a wetting agent and the resulting aqueous dispersions employed as sprays. In other procedures, the compounds can be employed in oil or other solvents, or as a constitutent in solvent-in-water or water-in-solvent emulsions or as aqueous dispersions thereof which can be applied as a spray, drench or wash.

In representative operations, substantially complete kills and control of the seeds and seedlings of Japanese millet are obtained when aqueous compositions containing 1-furfuryl-3-phenyl urea or 1-furfuryl-1-methyl-3-phenyl urea are applied to soil in amounts sufficient to apply the toxic compound at a rate of 75 pounds per acre. In other representative operations, aqueous compositions containing 1-furfuryl-1-methyl-3-phenyl urea or 1-methyl-3-phenyl-1-(tetrahydrofurfuryl) urea at a concentration of 5000 parts per million give substantially complete kills of tomato plants and crabgrass when such aqueous toxicant compositions are applied to plants to the point of run-off.

I claim:
1. The urea compound selected from the group consisting of 1-furfuryl-3-phenyl urea, 1-furfuryl-1-methyl-3-phenyl urea and 1-methyl-3-phenyl-1-(tetrahydrofurfuryl) urea.
2. The urea compound claimed in claim 1 wherein the urea is 1-furfuryl-3-phenyl urea.
3. The urea compound claimed in claim 1 wherein the urea is 1-furfuryl-1-methyl-3-phenyl urea.
4. The urea compound claimed in claim 1 wherein the urea is 1-methyl-3-phenyl-1-(tetrahydrofurfuryl) urea.

References Cited

UNITED STATES PATENTS 2,929,702   3/1960   Speziale _____ 260—347.3

NICHOLAS S. RIZZO, *Primary Examiner.*

UNITED STATES PATENT OFFICE
CERTIFICATE OF CORRECTION

Patent No. 3,393,209                                                         July 16, 1968

Theodore E. Majewski

It is certified that error appears in the above identified patent and that said Letters Patent are hereby corrected as shown below:

Column 1, lines 15 to 19, the formula should appear as shown below:

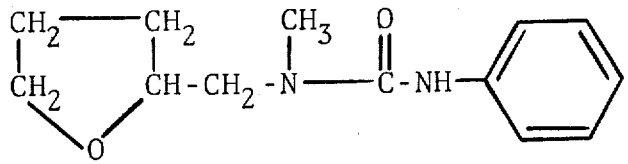

same column 1, lines 20 to 23, the formula should appear as shown below:

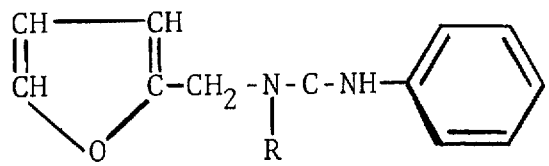

Signed and sealed this 13th day of January 1970.

(SEAL)
Attest:

EDWARD M. FLETCHER, JR.                                WILLIAM E. SCHUYLER, JR
Attesting Officer                                               Commissioner of Patents